(12) United States Patent
Cremin et al.

(10) Patent No.: US 11,244,053 B2
(45) Date of Patent: Feb. 8, 2022

(54) COUNTERFEIT ELECTRONIC DEVICE DETECTION

(71) Applicant: DEVICEATLAS LIMITED, Dublin (IE)

(72) Inventors: Ronan Cremin, Dublin (IE); John Leonard, Dublin (IE)

(73) Assignee: DEVICEATLAS LIMITED, Dublin (IE)

(*) Notice: Subject to any disclaimer, the term of this patent is extended or adjusted under 35 U.S.C. 154(b) by 214 days.

(21) Appl. No.: 16/081,217

(22) PCT Filed: Mar. 3, 2017

(86) PCT No.: PCT/EP2017/055105
§ 371 (c)(1),
(2) Date: Aug. 30, 2018

(87) PCT Pub. No.: WO2017/149159
PCT Pub. Date: Sep. 8, 2017

(65) Prior Publication Data
US 2019/0026469 A1    Jan. 24, 2019

(30) Foreign Application Priority Data

Mar. 3, 2016 (EP) .................................. 16158545

(51) Int. Cl.
*G06F 11/00* (2006.01)
*G06F 21/57* (2013.01)
(Continued)

(52) U.S. Cl.
CPC .............. *G06F 21/57* (2013.01); *G06F 16/95* (2019.01); *G06F 21/44* (2013.01); *G06Q 30/0185* (2013.01)

(58) Field of Classification Search
CPC .......... G06F 16/95; G06F 21/44; G06F 21/57; G06F 17/30861
See application file for complete search history.

(56) References Cited

U.S. PATENT DOCUMENTS 8,555,384 B1 * 10/2013 Hanson ............... H04L 63/1408
726/22
9,563,749 B2 * 2/2017 Wyatt ................... G06F 21/562
(Continued)

OTHER PUBLICATIONS

"Device Detection: Technical Overview," Netbiscuits Gmbh, Mar. 2014, 5 pages [retrieved online Aug. 2, 2016 from: web.archive.org/web/20150913044642/http://www.netbiscuits.com/wp-content/uploads/2014/04/Netbiscuits-Device-Detection-Technical-Overview.pdf].

(Continued)

*Primary Examiner* — Gary S Gracia
(74) *Attorney, Agent, or Firm* — Sheridan Ross P.C.

(57) ABSTRACT

A method of determining that a subject electronic device $102_{1\ldots N}$ is counterfeit. The method involves delivering the web page component to a subject device $102_{1\ldots N}$ in response to a request. The web page component is adapted to retrieve actual values of a plurality of attributes from the subject device $102_{1\ldots N}$. Reference values of the plurality of attributes are retrieved from a device property store 110 and the method determined that the subject device $102_{1\ldots N}$ is counterfeit when at least one of the actual values of the plurality of attributes is different to the reference value of that attribute.

16 Claims, 4 Drawing Sheets

(51) Int. Cl.
*G06Q 30/00* (2012.01)
*G06F 16/95* (2019.01)
*G06F 21/44* (2013.01)
*G06F 12/14* (2006.01)

(56) References Cited

U.S. PATENT DOCUMENTS

| | | | | |
|---|---|---|---|---|
| 9,972,146 | B1* | 5/2018 | Beard | G07C 9/257 |
| 2002/0099936 | A1* | 7/2002 | Kou | H04L 69/329 |
| | | | | 713/151 |
| 2003/0208561 | A1* | 11/2003 | Hoang | H04N 21/845 |
| | | | | 709/219 |
| 2007/0169189 | A1* | 7/2007 | Crespo | H04L 63/0807 |
| | | | | 726/20 |
| 2010/0313037 | A1* | 12/2010 | Ward | G06Q 10/08 |
| | | | | 713/189 |
| 2011/0035784 | A1* | 2/2011 | Jakobsson | H04L 67/02 |
| | | | | 726/2 |
| 2011/0072499 | A1* | 3/2011 | Lin | H04L 63/0853 |
| | | | | 726/6 |
| 2011/0254687 | A1* | 10/2011 | Arponen | H04M 1/72406 |
| | | | | 340/540 |
| 2011/0295908 | A1* | 12/2011 | To | G06F 21/73 |
| | | | | 707/803 |
| 2012/0240236 | A1* | 9/2012 | Wyatt | G06F 21/10 |
| | | | | 726/25 |
| 2013/0031120 | A1 | 1/2013 | Passani et al. | |
| 2013/0198066 | A1* | 8/2013 | Wall | G06Q 20/3278 |
| | | | | 705/41 |
| 2014/0099928 | A1* | 4/2014 | Caldwell | H04W 12/126 |
| | | | | 455/411 |
| 2014/0103105 | A1* | 4/2014 | Chen | G06K 19/06056 |
| | | | | 235/375 |
| 2014/0172712 | A1* | 6/2014 | Petersen | G06Q 10/00 |
| | | | | 705/44 |
| 2014/0282986 | A1* | 9/2014 | Leung | H04L 63/10 |
| | | | | 726/9 |
| 2016/0183166 | A1* | 6/2016 | Chen | H04W 4/90 |
| | | | | 455/435.1 |
| 2017/0318046 | A1* | 11/2017 | Weidman | H04L 63/1441 |

OTHER PUBLICATIONS

Figueiredo Loureiro et al. "Substandard Cell Phones: Impact on Network Quality and a New Method to Identify an Unlicensed IMEI in the Network," IEEE Communications magazine, Mar. 2014, vol. 52, No. 3, pp. 90-96.
Frederick et al. "Beginning Smartphone Web Development," Apress, Apr. 2010, Chapter 4, pp. 97-100.
Mobile Manufacturers Forum "Counterfeit/Substandard Mobile Phones—A Resource Guide For Governments," ITU Event on Combating Counterfeit and Substandard ICT Devices, ITU Headquarters, Geneva, Nov. 17-18, 2014, 12 pages.
International Search Report issued by the European Patent Office for International Patent Application No. PCT/EP2017/055105, dated Jun. 28, 2017, 4 pages.
Written Opinion issued by the European Patent Office for International Patent Application No. PCT/EP2017/055105, dated Jun. 28, 2017, 7 pages.

* cited by examiner

COUNTERFEIT ELECTRONIC DEVICE DETECTION

CROSS REFERENCE TO RELATED APPLICATIONS

This application is a national stage application under 35 U.S.C. 371 of PCT Application No. PCT/EP2017/055105, having an international filing date of 3 Mar. 2017, which designated the United States, which PCT application claimed the benefit of European Patent Application Serial No. 16158545.0, filed 3 Mar. 2016, both of which are incorporated by reference in their entirety.

FIELD OF THE DISCLOSURE

The present disclosure relates to the detection of counterfeit electronic devices. The disclosure has particular application to the detection of counterfeit mobile devices.

BACKGROUND TO THE DISCLOSURE

Electronic devices having web browsers for retrieving information from the World Wide Web broadly fall into two categories: desktop computers and mobile devices. Counterfeits of both these types of devices are increasingly available to consumers, but in particular counterfeit mobile devices.

Counterfeit devices tend to be of inferior quality, often having sub-standard components or running incorrect software. This leads to problems for users, who encounter problems using their counterfeit device. It also creates problems for manufacturers and service providers, not just through loss of revenue from lost sales, but due to having to deal with enquiries from users having problems using counterfeit devices. Other problems of counterfeit devices include a genuine danger to consumers. Counterfeit devices are likely to have a poorer quality batteries (more susceptible to fire) and can also be exposing their users to more EMF radiation than the real device.

In order to address this, attention has so far been focused on limiting the distribution of counterfeit devices. For example, with the assistance of government agencies, efforts have been made to intercept shipments of counterfeit devices. Attempts have also been made to educate consumers so that they do not unintentionally or knowingly purchase counterfeit devices. These measures have not been entirely successful, and there remains a need to improve measures for limiting the proliferation of counterfeit devices.

An internet publication by Netbiscuits Gmbh entitled 'Device Detection', 13 Sep. 2015 discloses a technique to help make web pages work on multiple different devices. There are many other public discussions of this technique. The technique uses server-side detection combined with dynamic properties interrogated from a mobile device in real time. However this approach does not attempt to mitigate against counterfeit electronic devices.

Another publication MOBILE MANUFACTURERS FORUM: 'Counterfeit/Substandard Mobile Phones—A resource guide for governments' dated July 2014 recognises the problem of counterfeit mobile phone devices and mentions at a high level a means by which a mobile device can be detected as possible counterfeit based on a 3GPP telecommunication standard. The publication offers no effective technical solution in which electronic devices can be identified as definitively counterfeit. 3GPP confines itself to the lower level cellular networking aspect of a mobile device.

It is an object to provide a system and method to determine whether an electronic device a counterfeit.

SUMMARY OF THE DISCLOSURE

According to a first aspect of the present invention, there is provided, as set out in the appended claims, a method of determining that a subject device ($102_{1\ldots N}$) is counterfeit, the method comprising:

receiving a request from the subject device ($102_{1\ldots N}$) for a web page component;

delivering the web page component to the subject device ($102_{1\ldots N}$), which web page component is adapted to retrieve or determine from the subject device ($102_{1\ldots N}$) actual values of a plurality of attributes of the subject device ($102_{1\ldots N}$);

receiving the actual values of the plurality of attributes from the webpage component;

retrieving reference values of the plurality of attributes from a device property store (110); and determining that the subject device ($102_{1\ldots N}$) is counterfeit when at least one of the actual values of the plurality of attributes is different to the reference value of that attribute.

It will be appreciated that according to one aspect of the invention can be performed passively when a user visits a participating website. For example, a sample use case is a Vodafone, or other operator, website can perform a check for handset authenticity before allowing a user to incur costs when making a call to technical support. This check can be performed with or without the knowledge of the user.

A central aspect to the invention is that a modern mobile smart phone or communications device is composed of many component parts, both hardware and software. Many of these hardware and software components include an identifier that identifies the type of the component or, in some cases, uniquely identifies a both the type and particular instance. The invention brings together two separate technical disciplines that heretofore have not been practiced together: web browser knowledge and mobile/cellular telephony knowledge. The technique of the present invention derives information from the browser component of an electronic device, such as a smartphone. The presence of a web browser provides enough information to perform one set of tests by comparing the claim of the device's identity supplied in a user-agent string with its measured properties. In addition any device with a web browser lends itself to the approach of the present invention, for example iPads and other tablets. In other words the counterfeit identification technique is not confined to mobile phones or even devices that have cellular radios.

In one embodiment the method comprises the steps of:

receiving identity information representing the identity of the subject device ($102_{1\ldots N}$); and selecting the reference values of the plurality of attributes based on the identity information.

In one embodiment receiving the identity information comprises the request received from the subject device ($102_{1\ldots N}$) including the identity information.

In one embodiment the identity information is a User-Agent string.

In one embodiment wherein receiving the identity information comprises receiving the identity information from a mobile communications network via which the subject device ($102_{1\ldots N}$) sends the request.

In one embodiment the identity information is an International Mobile Station Equipment Identity, IMEI, or Type Allocation Code, TAC, of the subject device ($102_{1...N}$). It will be appreciated the determination can be made by utilizing a different device ID embedded in the device, such as the TAC/IMEI, to cross-reference against the purported device type. In this case the ID sent by the device in one interaction is compared to an identifier interrogated from another channel to make the counterfeit determination.

In another embodiment there is provided a system or apparatus for determining that a subject device is counterfeit, the apparatus comprising a server arranged to:

receive a request from the subject device for a web page component;

deliver the web page component to the subject device, which web page component is adapted to retrieve or determine from the subject device actual values of a plurality of attributes of the subject device;

receive the actual values of the plurality of attributes from the web page component;

retrieve reference values of the plurality of attributes from a device property store; and determine that the subject device is counterfeit when at least one of the actual values of the plurality of attributes is different to the reference value of that attribute.

In another embodiment there is provided a method of determining that a subject electronic device is counterfeit, the method comprising:

receiving a request from the subject device for a mobile app and downloading the mobile app to the subject device;

configuring a component associated with the mobile app, which component is adapted to retrieve from the subject device actual values of a plurality of attributes of the subject device;

receiving the actual values of the plurality of attributes from the component;

retrieving reference values of the plurality of attributes from a device property store; and determining that the subject device is counterfeit when at least one of the actual values of the plurality of attributes is different to the reference value of that attribute.

In one embodiment the step of receiving a request is triggered when the subject device launches the mobile app residing on the device or when the mobile app is downloaded to the subject device from a remote location.

In one embodiment the mobile app residing on the device comprises at least one of: a pre-provisioned app; a stock app; or a default app.

In another embodiment there is provided a method of determining that a subject electronic device is counterfeit, the method comprising:

configuring a component associated with a mobile app residing on the subject device, which component is adapted to retrieve from the subject device actual values of a plurality of attributes of the subject device;

receiving the actual values of the plurality of attributes from the component;

retrieving reference values of the plurality of attributes from a device property store; and determining that the subject device is counterfeit when at least one of the actual values of the plurality of attributes is different to the reference value of that attribute.

In another embodiment there is provided a system or apparatus for determining that a subject device is counterfeit, the apparatus comprising a server arranged to:

receive a request from the subject device for a mobile app and downloading the mobile app to the subject device;

configure a component associated with the mobile app, which component is adapted to retrieve from the subject device actual values of a plurality of attributes of the subject device;

receive the actual values of the plurality of attributes from the component;

retrieve reference values of the plurality of attributes from a device property store; and determine that the subject device is counterfeit when at least one of the actual values of the plurality of attributes is different to the reference value of that attribute.

In another embodiment there is provided a system or apparatus for determining that a subject device is counterfeit, the apparatus comprising a server arranged to:

receive a request from the subject device for a mobile app and downloading the mobile app to the subject device;

configure a component associated with the mobile app, which component is adapted to retrieve from the subject device actual values of a plurality of attributes of the subject device;

receive the actual values of the plurality of attributes from the component;

retrieve reference values of the plurality of attributes from a device property store; and determine that the subject device is counterfeit when at least one of the actual values of the plurality of attributes is different to the reference value of that attribute.

Use of the words "apparatus", "server", "device", "processor" and so on are intended to be general rather than specific. Whilst these features of the disclosure may be implemented using an individual component, such as a computer or a central processing unit (CPU), they can equally well be implemented using other suitable components or a combination of components. For example, they could be implemented using a hard-wired circuit or circuits, e.g. an integrated circuit, or using embedded software.

It can also be appreciated that the method can be implemented, at least in part, using computer program code. According to another aspect of the present disclosure, there is therefore provided computer software or computer program code adapted to carry out the method described above when processed by a computer processing means. The computer software or computer program code can be carried by computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The disclosure also extends to a processor running the software or code, e.g. a computer configured to carry out the method described above.

A preferred embodiment of the invention is described below, by way of example only, with reference to the accompanying drawings.

DESCRIPTION OF PREFERRED EMBODIMENTS

First Embodiment

Figure 1:
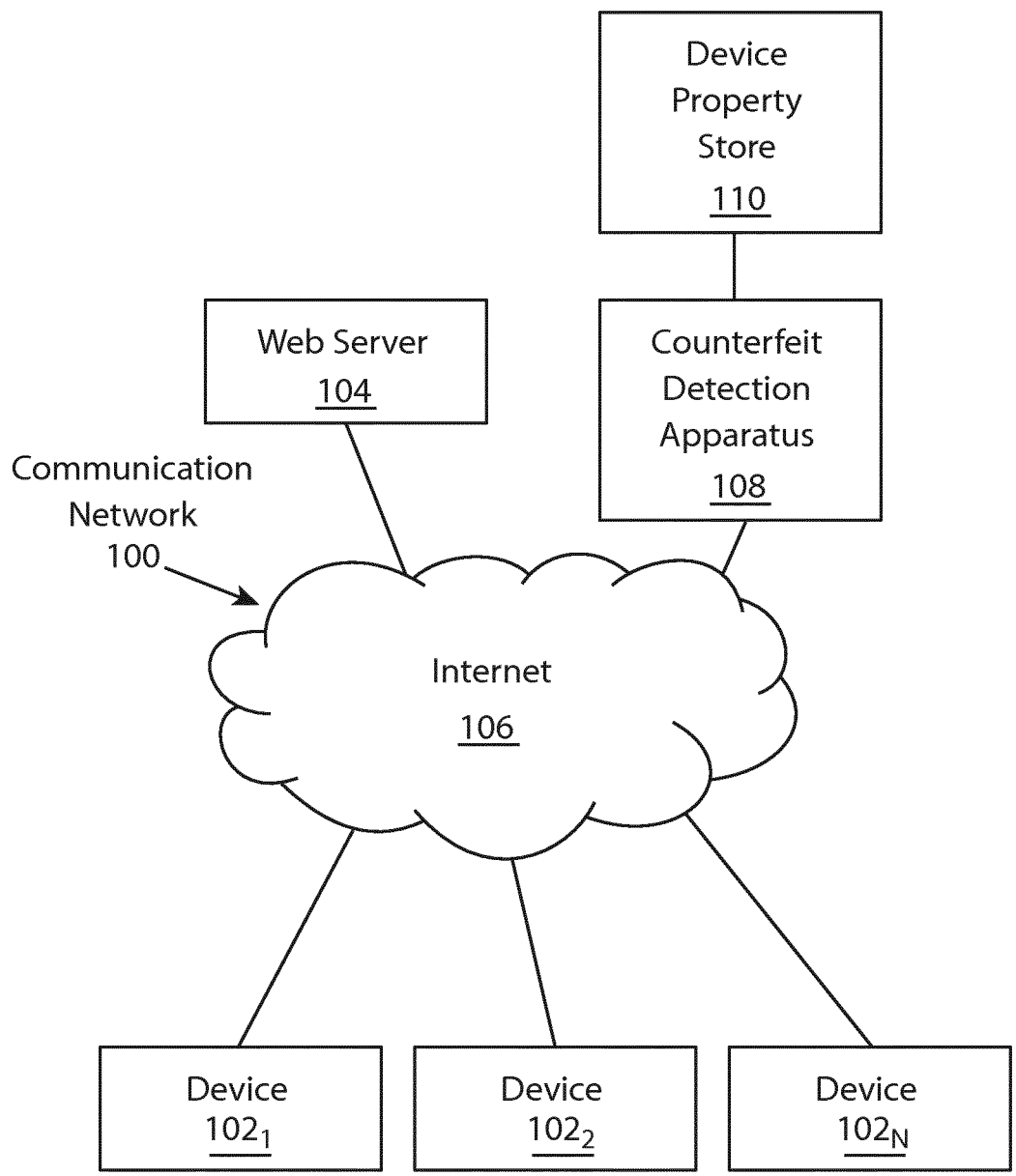
FIG. 1 is a schematic diagram of a communication network illustrating a first embodiment of the present disclosure.

Referring to FIG. 1, according to a first embodiment, a communication network 100 comprises a plurality of devices $102_{1, 2, \ldots N}$ able to communicate with a web server 104 via the Internet 106.

The devices $102_{1, 2, \ldots N}$ are arranged to access the Internet 106. The devices $102_{1, 2, \ldots N}$ are any type of device capable of communicating with the web server 104 via the Internet 106. The devices $102_{1, 2, \ldots N}$ have each have a web browser for this purpose. In this embodiment, the devices $102_{1, 2, \ldots N}$ are Smartphones.

In one embodiment the web server 104 hosts a web page. The web page is a customer support web page for the manufacturer of the devices $102_{1, 2, \ldots N}$. The web page contains information useful to users of the devices $102_{1, 2, \ldots N}$. Such information includes explanations of how to solve common problems, and contact details for a customer support centre that can assist users with less common problems. The web server 104 is able to access the Internet 106 via a suitable communications link. In this embodiment, the web server 104 is arranged to access the Internet 106 using a hardwired broadband line. It will be appreciated that a mobile operator can also host such a page since most mobile phone users get their phones from their operator. The server 104 can be owned/operated by a totally separate entity to 108+110. One of the aspects of the invention is that the determination of genuineness can be done easily and remotely, with almost no work on the part of the entity running a host webpage.

The communications network 100 also includes a counterfeit detection apparatus 108 and a device property store 110. In this embodiment, the counterfeit detection apparatus 108 and the device property store 110 are implemented in a single physical device. Specifically, the counterfeit detection apparatus 108 is implemented in a computer server and the device property store 110 is implemented in a memory device of the computer server. However, this is not essential. The counterfeit detection apparatus 108 and the device property store 110 may be separate from one another. They may additionally be located at different physical locations, meaning that they communicate with each other via a Local Area Network (LAN) or via the Internet 106. The counterfeit detection apparatus 108 is able to access the Internet 106 via a suitable communications link. In this embodiment, the counterfeit detection apparatus 108 is arranged to access the Internet 106 using a hardwired broadband line.

The counterfeit detection apparatus 108 hosts a web page component. The web page component comprises first computer executable code arranged to cause the devices $102_{1, 2, \ldots N}$ to perform operations. In this embodiment, the web page component is an iframed page consisting of HTML and JavaScript™. The web page hosted by the web server 104 includes second computer executable code arranged to direct the devices $102_{1, 2, \ldots N}$ to the web page component hosted by the counterfeit detection apparatus 108. In this embodiment, the second computer executable code is a HyperText Markup Language (HTML) iframe including an object that comprises a link to the web page component. The iframe section of the page can be configured to be invisible or visible and its operation or effectiveness is not altered either way. Many tracking services on the web operate in invisible iframes embedded on pages, unbeknownst to users. An iframed page can be rendered at any size on the host page. Advertisements are typically 460×60 pixels but 0×0 pixels would be equally effective in the context of the present invention. Alternatively the iframed page can be exposed to the user as a panel on the host page and could, for example, show a little icon with details about the authenticity of the handset visiting the page. It is immaterial if anything is visible to the user but something of value could optionally be displayed, or just some kind of brand logo saying "DeviceCheck" or some such message.

The device property store 110 stores information about properties of the devices $102_{1, 2, \ldots N}$. Specifically, the device property store 110 stores values of attributes of the devices $102_{1, 2, \ldots N}$.

A property is a characteristic of a device $102_{1, 2, \ldots N}$, such as a physical feature or capability of the device $102_{1, 2, \ldots N}$ or its software. Each property is considered to comprise an attribute having a value. In other words, an attribute is the nature of the property and the value is the measure of the property. For example, screen width is a property defined by an attribute of "number of pixels across the width of the screen" and a value of "150 pixels". In another example, ability to display Joint Photographic Experts Group (JPEG) images is a property defined by an attribute of "Support for displaying JPEG images?" and a value of "true" (or "false"). In another example, the operating system version of a device $102_{1, 2, \ldots N}$ is a property defined by an attribute of "operating system version number" and a value of "8.2.1". In yet another example, the manufacturer of a device $102_{1, 2, \ldots N}$ is a property defined by an attribute of "name of manufacturer" and a value of "Apple". It can therefore be appreciated that the values can be Boolean, numbers or strings.

Values are stored for the same attributes for different types of the devices $102_{1, 2, \ldots N}$. In other words, for each type of device $102_{1, 2, \ldots N}$, the device property store 110 includes values for the same set of attributes. In one embodiment the attributes detected for the device can be used to make a decision whether a device is counterfeit or a strong probability that a device is counterfeit and warrants further investigation.

The device property store 110 also stores confidence parameters for the values. Each confidence parameter represents the probability that an actual device $102_{1, 2, \ldots N}$ with the same User-Agent string as that by which a set of properties is indexed has the value stored in the device property store 110 for the attribute to which confidence parameter applies. Other HTTP headers can also be used. It will be appreciated that device property store and the probability store for those properties can be separate databases.

The values are indexed according to User-Agent strings associated with the different types of devices $102_{1, 2, \ldots N}$. A User-Agent string is a string found in request headers of requests sent by web browsers using Hypertext Transfer Protocol (HTTP). User-Agent strings are usually unique to the type of the subject device $102_{1, 2, \ldots N}$ and its web browser. It may also be unique to the version of the type of the subject device $102_{1, 2, \ldots N}$ and/or its web browser, that is updates that may have been made to the subject device $102_{1, 2, \ldots N}$ and/or its web browser since they were first manufactured or supplied to the user. So, in this embodiment, all devices $102_{1, 2, \ldots N}$ having the same User-Agent string are considered to be the same type of device $102_{1, 2, \ldots N}$.

In one embodiment, the properties stored in the device property store 110 are stored as described in patent publication no. WO2009/101414, the entire content of which is incorporated herein by reference. This means that the User-Agent strings in the device property store 110 are arranged in a tree based on traversing the characters of the User-Agent strings from left to right. Properties are indexed at nodes of the tree, positioned at the highest node in the tree at which the property is common to all devices $102_{1, 2, \ldots N}$ having a User-Agent string referenced by the node.

An example of the properties stored in the device property store 110 is given in Table 1 below, for a type of device $102_{1, 2, \ldots N}$ indexed by User-Agent string Apple-iPhone7C2/1202.466. The probability can be determined from historical evidence provided for devices of the same type.

TABLE 1

Apple-iPhone7C2/1202.466

| Attribute | Value | Sample Confidence Parameter |
|---|---|---|
| Device Vendor | Apple | 99.9% |
| Device Model | iPhone 6 A1549 | 99.9% |
| Marketing Name | iPhone 6 | 99.9% |
| Manufacturer | Apple | 99.9% |
| Year Released | 2014 | 99.9% |
| Mobile Device | True | 99.9% |
| Primary Hardware Type | Mobile Phone | 99.9% |
| Touch Screen | True | 99.9% |
| Screen Width | 750 | 99.9% |
| Screen Height | 1334 | 99.9% |
| Diagonal Screen Size | 4.7 | 99.9% |
| Display Pixels Per Inch (PPI) | 326 | 99.9% |
| Device Pixel Ratio | 2 | 99.9% |
| Screen Color Depth | 24 | 99.9% |
| NFC | True | 99.9% |
| Camera | 8.0 | 99.9% |
| Is Mobile Phone | True | 99.9% |
| Is Tablet | False | 99.9% |
| Is eReader | False | 99.9% |
| Is Games console | False | 99.9% |
| Is TV | False | 99.9% |
| Is Media Player | False | 99.9% |
| Operating System Name | iOS | 99.9% |
| Operating System Version | 8 | 99.9% |
| Operating System Android | False | 99.9% |
| Operating System Bada | False | 99.9% |
| Operating System iOS | True | 99.9% |
| Operating System Rim | False | 99.9% |
| Operating System Symbian | False | 99.9% |
| Operating System Windows Mobile | False | 99.9% |
| Operating System Windows Phone | False | 99.9% |
| Operating System Windows RT | False | 99.9% |
| Browser Name | Safari | 99.9% |
| Browser Rendering Engine | WebKit | 99.9% |
| Markup XHTML Basic 1.0 | True | 99.9% |
| Markup XHTML MP 1.0 | True | 99.9% |
| Markup XHTML MP 1.1 | True | 99.9% |
| Markup XHTML MP 1.2 | True | 99.9% |
| Image Gif87 | True | 99.9% |
| Image GIF89A | True | 99.9% |
| Image JPG | True | 99.9% |
| Image PNG | True | 99.9% |
| Usable Display Width | 375 | 99.9% |
| Usable Display Height | 667 | 99.9% |
| Cookie | True | 99.9% |
| Hypertext Transfer Protocol Secure (HTTPS) | True | 99.9% |
| Memory Limit Download | 0 | 99.9% |
| Flash Capable | False | 99.9% |

TABLE 1-continued

Apple-iPhone7C2/1202.466

| Attribute | Value | Sample Confidence Parameter |
|---|---|---|
| Java Script Support Basic | True | 99.9% |
| Java Script | | |
| Java Script Modify Dom | True | 99.9% |
| Java Script Modify CSS | True | 99.9% |
| Java Script Support Events | True | 99.9% |
| Java Script Support Event Listener | True | 99.9% |
| Java Script XHR | True | 99.9% |
| Supports Client Side | True | 99.9% |
| General Packet Radio Service (GPRS) | True | 99.9% |
| Enhanced Data rates for GSM Evolution (EDGE) | True | 99.9% |
| High-Speed Downlink Packet Access (HSDPA) | True | 99.9% |
| Universal Mobile Telecommunications System (UMTS) | True | 99.9% |
| Evolved High-Speed Packet Access (HSPA+) | True | 99.9% |
| Long Term Evolution (LTE) | True | 99.9% |
| LTE Advanced | True | 99.9% |
| LTE Category | 4 | 99.9% |
| Voice over LTE (VoLTE) | True | 99.9% |
| Wi-Fi | True | 99.9% |
| Hypertext Transfer Protocol (HTML) Audio | True | 99.9% |
| HTML Canvas | True | 99.9% |
| HTML Inline Scalable Vector Graphics (SVG) | True | 99.9% |
| HTML SVG | True | 99.9% |
| HTML Video | True | 99.9% |
| CSS Animations | True | 99.9% |
| CSS Columns | True | 99.9% |
| CSS Transforms | True | 99.9% |
| CSS Transitions | True | 99.9% |
| JavaScript Application Cache | True | 99.9% |
| JavaScript Geo Location | True | 99.9% |
| JavaScript Local Storage | True | 99.9% |
| JavaScript Session Storage | True | 99.9% |
| JavaScript Web GL | True | 99.9% |
| JavaScript Web Sockets | True | 99.9% |
| JavaScript Web SQL Database | True | 99.9% |
| JavaScript Web Workers | True | 99.9% |
| JavaScript Device Orientation | True | 99.9% |
| JavaScript Device Motion | True | 99.9% |
| JavaScript Touch Events | True | 99.9% |
| JavaScript Query Selector | True | 99.9% |
| Stream 3GP H.264 Level 1.0 | True | 99.9% |
| Stream 3GP H.264 Level 1.0b | True | 99.9% |
| Stream 3GP H.264 Level 1.1 | True | 99.9% |
| Stream 3GP H.264 Level 1.2 | True | 99.9% |
| Stream 3GP H.264 Level 1.3 | True | 99.9% |
| Stream 3GPP AAC LC | True | 99.9% |
| Stream 3GPP H.263 | False | 99.9% |
| Stream 3GPP AMR NB | True | 99.9% |
| Stream 3GPP AMR WB | True | 99.9% |
| Stream MP4 H.264 Level 1.1 | True | 99.9% |
| Stream MP4 H.264 Level 1.3 | True | 99.9% |
| Stream MP4 AAC LC | True | 99.9% |
| Stream HTTP Live Streaming | True | 99.9% |
| WMV | False | 99.9% |
| QCELP In Video | False | 99.9% |
| 3GP H.264 Level 1.0 | True | 99.9% |
| 3GP H.264 Level 1.0b | True | 99.9% |
| 3GP H.264 Level 1.1 | True | 99.9% |
| 3GP H.264 Level 1.2 | True | 99.9% |
| 3GP H.264 Level 1.3 | True | 99.9% |
| 3GPP AAC LC | True | 99.9% |
| 3GPP H.263 | True | 99.9% |
| 3GPP AMR NB | True | 99.9% |
| MP4 H.264 Level 1.1 | True | 99.9% |
| MP4 H.264 Level 1.3 | True | 99.9% |
| MP4 AAC LC | True | 99.9% |

TABLE 1-continued

Apple-iPhone7C2/1202.466

| Attribute | Value | Sample Confidence Parameter |
|---|---|---|
| MP3 | True | 99.9% |
| AAC | True | 99.9% |
| iQuery Mobile | True | 99.9% |

Since the devices $102_{1, 2, \ldots N}$, the web server 104 and the counterfeit detection apparatus 108 are connected to the Internet 106, they can communicate with one another via the Internet 106. The devices $102_{1, 2, \ldots N}$, the web server 104 and the counterfeit detection apparatus communicate with one another using a communications protocol. In this embodiment, the communications protocol is Hypertext Transfer Protocol (HTTP). The counterfeit detection apparatus 108 can incorporate a server configured to 1) serve up the contents of the iframe embedded on the page served by 104 and 2) to receive the information retrieved by JavaScript code running on the device.

Figure 2:
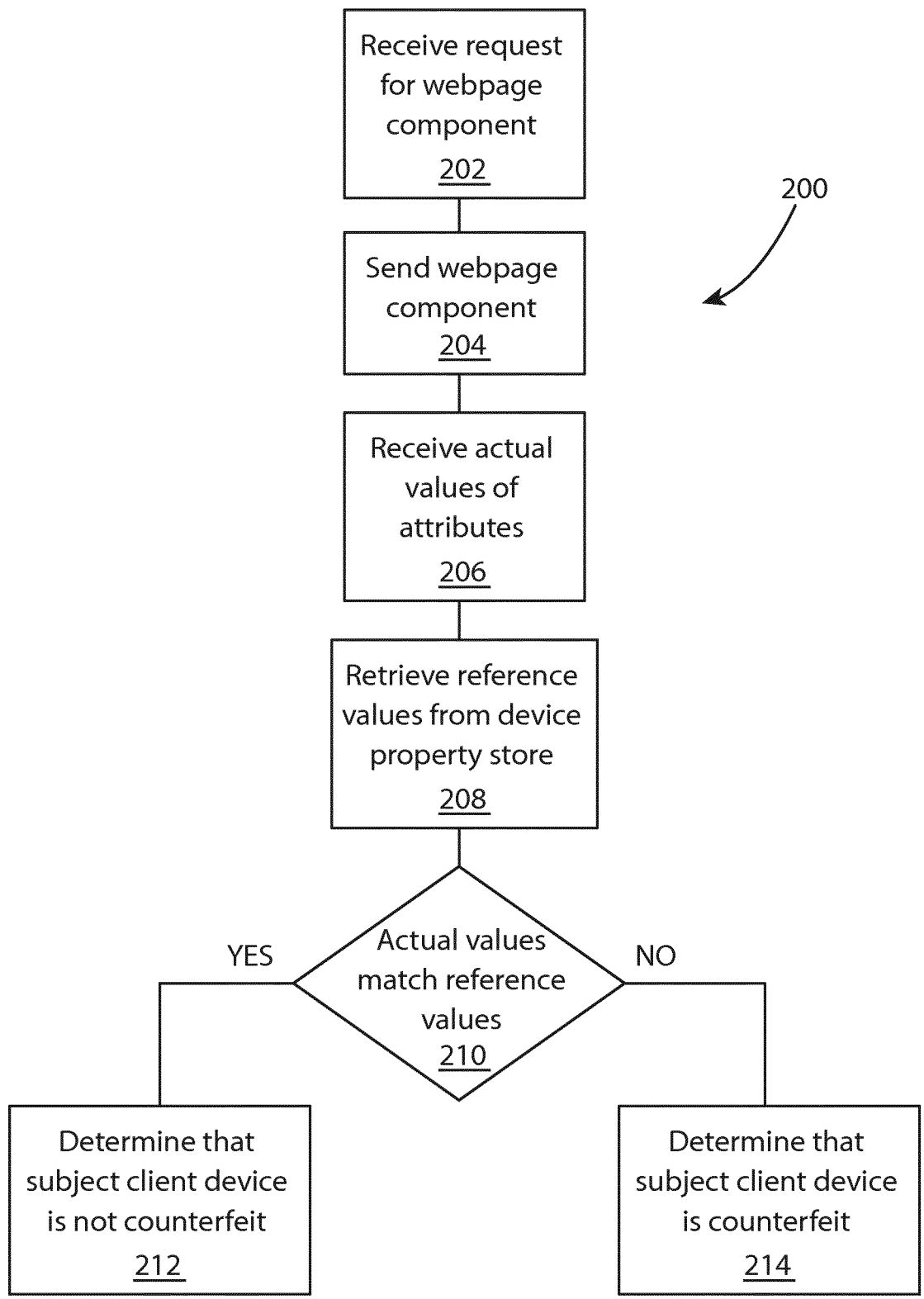
FIG. 2 is a flowchart illustrating a method of determining that a device operating in the communication network is counterfeit.

Referring to FIG. 2, in a method 200 of determining that a device $102_{1, 2, \ldots N}$ is counterfeit, at step 202, the counterfeit detection apparatus 108 receives a request for the web page component from one of the devices $102_{1, 2, \ldots N}$. This device $102_{1, 2, \ldots N}$ can be any of the devices $102_{1, 2, \ldots N}$. For the purposes of the present description, the device $102_{1, 2, \ldots N}$ sending the request for the web page component and consequently being subjected to the method is referred to as the subject device $102_{1, 2, \ldots N}$.

In this embodiment, the subject device $102_{1, 2, \ldots N}$ first sends a request to the web server 104 for the web page hosted by the web server 104. The web server 104 delivers the web page to the subject device $102_{1, 2, \ldots N}$ in response to the request. When the web browser of the subject device $102_{1, 2, \ldots N}$ renders the web page, the second computer executable code directs the subject device $102_{1, 2, \ldots N}$ to the web page component hosted by the counterfeit detection apparatus 108. In one embodiment if the web page delivered by 104 includes a reference to a page component hosted by 10 the page component is in fact another page, but rendered into an iframe on the host page. As discussed above, in this embodiment, the second computer executable code is an HTML page rendered in an iframe on the host page. In any event, the second computer executable code causes the web browser of the subject device $102_{1, 2, \ldots N}$ to send a request to the counterfeit detection apparatus 108 for the web page component. In response to this request, at step 204, the counterfeit detection apparatus 108 delivers the web page component to the subject device $102_{1, 2, \ldots N}$.

Each request may include multiple request headers and the request headers typically include a User-Agent string. Multiple other requests can be made in the course of loading a given web page. The counterfeit detection apparatus 108 stores the User-Agent string received in the request header.

Once the web page component has been delivered to the subject device $102_{1, 2, \ldots N}$, the web browser of the subject device $102_{1, 2, \ldots N}$ processes the web page component. In this embodiment, this involves executing the JavaScript™ of the web page component. Upon execution by the web browser, the web page component determines properties of the subject device $102_{1, 2, \ldots N}$. Specifically, the web page component determines reported values of attributes of the subject device $102_{1, 2, \ldots N}$. This involves retrieving values from a memory of the subject device $102_{1, 2, \ldots N}$. It also involves testing the subject device $102_{1, 2, \ldots N}$ to establish values of other attributes of the subject device $102_{1, 2, \ldots N}$.

The web page component retrieves actual values of attributes of the subject device $102_{1, 2, \ldots N}$ from the memory of the subject device $102_{1, 2, \ldots N}$ by looking up values in the memory of the subject device $102_{1, 2, \ldots N}$. Examples of attributes whose values are retrieved in this way can be found in Table 1.

The web page component also tests the subject device $102_{1, 2, \ldots N}$ to establish actual values of other attributes of the subject device $102_{1, 2, \ldots N}$ by requesting the subject device $102_{1, 2, \ldots N}$ to perform operations. For example, the web page component requests a processor of the subject device $102_{1, 2, \ldots N}$ to process a third computer executable code and measures the time it takes for the third computer executable code to be processed by the processor. This allows the web page component to determine the speed of the processor of the subject device $102_{1, 2, \ldots N}$. This test returns an actual value for the attribute of "current processor speed in GHz".

Once the web page component has determined the properties of the subject device $102_{1, 2, \ldots N}$, it sends the actual values of the attributes to the counterfeit detection apparatus 108. The counterfeit detection apparatus 108 receives the actual values of the subject device $102_{1, 2, \ldots N}$, at step 206.

At step 208, the counterfeit detection apparatus 108 uses the User-Agent string stored from the request to look up reference values for the attributes, or other methods as described above. This involves comparing the stored User-Agent string to the User-Agent strings in the device property store 110. In order to do this, the counterfeit detection apparatus 108 sends a query to the device property store 110 including the stored User-Agent string. The query uses the stored User-Agent string to traverse the tree of User-Agent strings in the device property store 110, retrieving properties indexed at the nodes of the tree that it passes. If the stored User-Agent string directly matches a User-Agent string in the device property store 110, the query causes all the properties for the type of device $102_{1, 2, \ldots N}$ associated with the User-Agent string to be retrieved from the device property store 110. If the stored User-Agent string is not exactly the same as User-Agent string in the device property store 110, then just the properties indexed at nodes of the tree referenced by an initial part of a User-Agent string in the device property store 110 that matches the stored User-Agent string are retrieved.

Once the counterfeit detection apparatus 108 has retrieved the properties from the device property store 110, it compares the actual values of the attributes to the reference values of the attributes, at step 210. If all of the actual values are the same as the reference values, the counterfeit detection apparatus 108 determines, at step 212, that the subject device $102_{1, 2, \ldots N}$ is not counterfeit. Alternatively, if an actual value of any of the attributes is different to the reference value for that attribute, the counterfeit detection apparatus 108 determines, at step 214, that the subject device $102_{1, 2, \ldots N}$ is counterfeit. Suitably a probability value can be provided where a predefined threshold can be selected to indicate whether a device is likely to be counterfeit or not.

In this embodiment, if the counterfeit detection apparatus 108 determines that the subject device $102_{1, 2, \ldots N}$ is counterfeit, it sends a token to the web page component indicating that the device is counterfeit. The web page hosted by the web server 104 prevents access to customer support provided by the web page based on this token. For example, the token may not allow access to other web pages hosted by the web server 104. It will be appreciated that for the invention the response to sending the property set to 108 would be a response indicating real/fake with a confidence level. The response can be used to change attributes of a page e.g. changing a panel from green to red as appropriate (via logic executed by JavaScript running in the iframed page). Alternatively, the iframed page could be redirected to another page.

Figure 3:
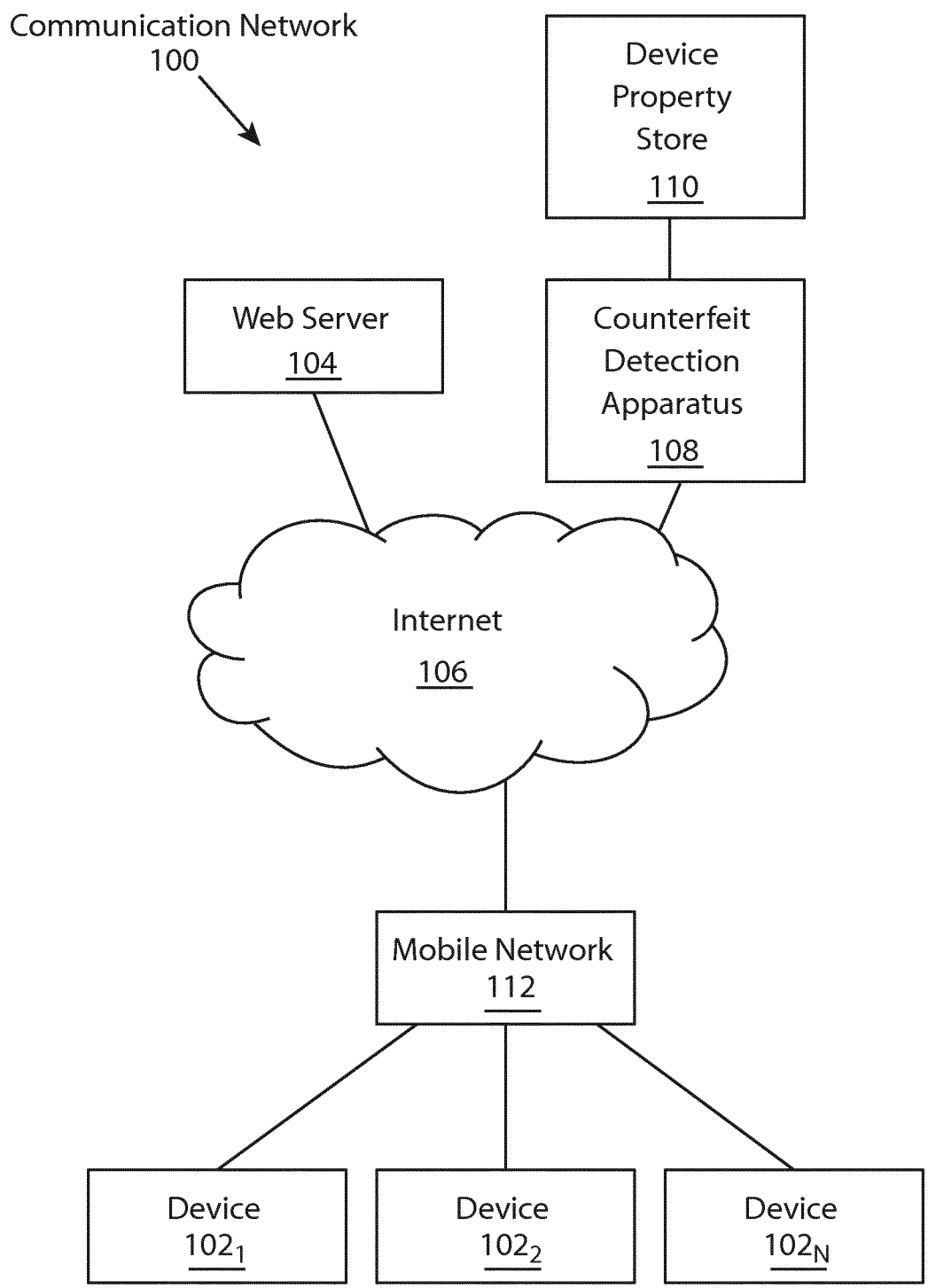
FIG. 3 is a schematic diagram of a communication network illustrating a second embodiment of the present disclosure.

Referring to FIG. 3, according to a second embodiment, the communication network 100 incorporates a mobile network 112 and the devices $102_{1, 2, \ldots N}$ are able to access the Internet 106 and communicate with the web server 104 via the mobile network 112. The mobile network 112 is a cellular network, operating using a currently available wireless communication standard, such as Global System for Mobile Communications (GSM), Universal Mobile Telecommunications System (UMTS) or Long-Term Evolution (LTE), to provide data communication. The mobile network 112 is linked to the Internet 106 via a gateway (not shown). In this second embodiment the mobile operator needs to be involved because, normally speaking, only the operator knows the device's IMEI (the TAC is a subset of this). When a phone latches onto a cellular network the network is informed of the devices IMEI (this is standard cellular telephony). The IMEI is not visible in a web context and hence not to web servers nor to JavaScript It will be appreciated that in other embodiments of the system that apart from the pure web embodiment (HTTP headers) and the cellular network embodiment (TAC) can be used. Each networking protocol tends to have a unique ID or type code that can be used as a reference or key for what the device is purporting to be e.g. for WiFi enabled devices there is a MAC address that could be used; for Bluetooth devices there is a similar code.

The devices $102_{1, 2, \ldots N}$ are mobile devices, that is any device capable of communicating with the Internet 104 via the mobile network 112. Typically, devices $102_{1, 2, \ldots N}$ incorporating a Subscriber Identification Module (SIM) card compatible with the mobile network 108 can communicate with the Internet 104 via the mobile network 108. A non-exhaustive list of examples of such mobile devices includes a Smartphone, a mobile telephone, a Personal Digital Assistant (PDAs), a tablet computer, a laptop computer, an eReader, a vehicle, a vehicle communication apparatus, a vehicle entertainment apparatus, a navigation device, a tracking device and a watch.

The properties stored in the device property store 110 are the same or similar to those listed by way of example only Table 1 above. However, in this embodiment, the device property store 110 is indexed according to Type Allocation Code (TAC) of the devices $102_{1, 2, \ldots N}$. The TAC, usually the first 8 digits of a 15 digit IMEI, for the device having the User-Agent string given in table 1 is 35923006.

The TAC embodiment can be an entire separate embodiment or an addition to the web embodiment to improve confidence, with one or more of the following features:
1) Device has random/junk HTTP headers. In this case the counterfeit device has likely failed to replicate the HTTP headers of the real device (most likely by error) and hence cannot be identified solely through HTTP headers. In this case the TAC is another way that the system and method can identify what the device is claiming to be.
2) It is also possible that the devices TAC is random/junk through error or laziness. In this case there is no programmatic way to identify the device and the system and method can fall back to asking the user what they think their device is.
3) If a device has correct TAC and HTTP headers (i.e. both mimicking the real device) the system and method can use the two "keys" into a data store to bolster the confidence in the determination. In certain cases devices purport to be one device according to the HTTP headers and another device via the TAC. In this case the system and method can run two checks, one for each claim. In the case where two or more IDs do not match then a decision can be made that the device is counterfeit. The additional indexing factor can be very useful and more keys can be considered (MAC address, Bluetooth)

It will be appreciated that some of the component identifiers explicitly identify the overall device rather than just the component. As an example, and indicated above, the IMEI of a device (and its sub-component, TAC) is a 15-digit number embedded in the cellular radio component of a phone that explicitly identifies the make and model of the phone. By comparison, some IDs such as the Bluetooth and WiFi MAC addresses are tied to the manufacturer of the particular component (e.g Broadcom device) rather than the overall device (e.g. Apple device). In the context of the present invention not all mobile communication devices have a cellular radio, such as most tablet devices, but importantly most electronic devices that access the internet essentially have at least a WiFi radio, and usually Bluetooth, to enable the invention determine if an electronic device is counterfeit or not.

Figure 4:
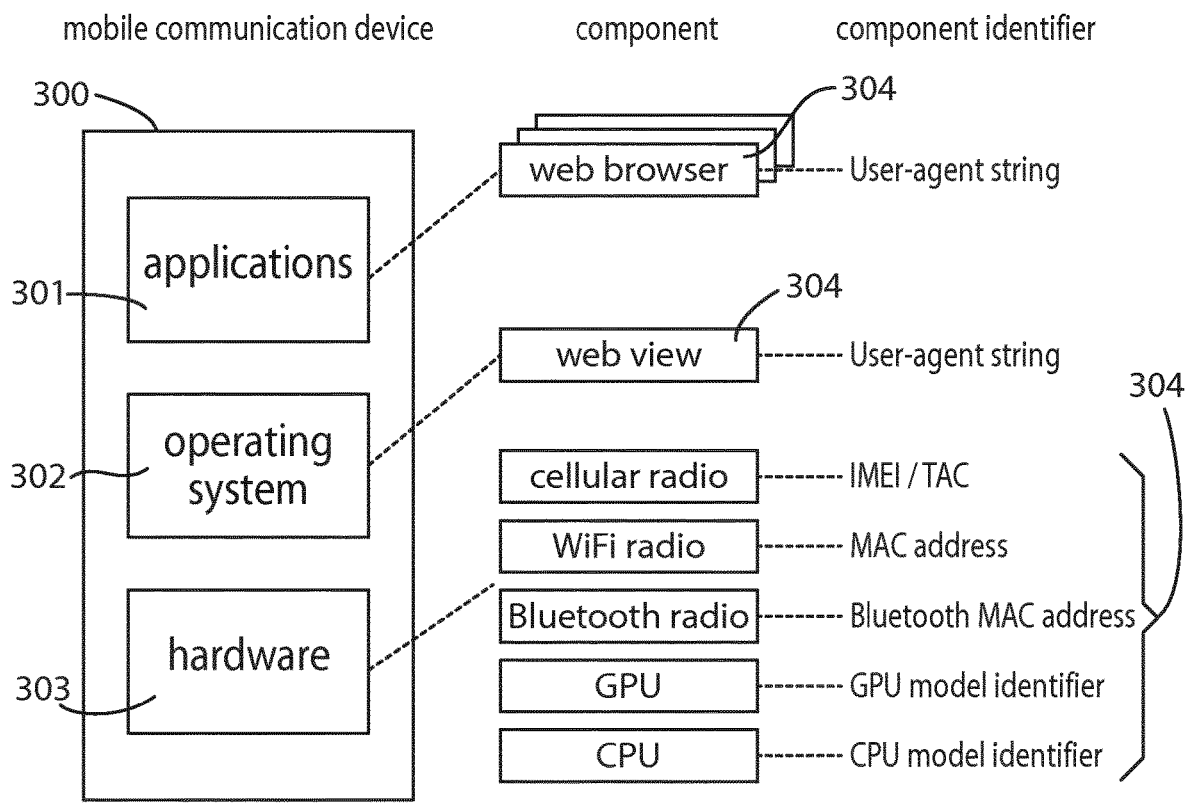
FIG. 4 is a schematic block diagram architecture of a hardware and software implementation for a mobile electronic device.

FIG. 4 is a schematic block diagram architecture of a hardware and software implementation for a typical mobile electronic device to be identified as counterfeit or authentic, indicated generally by the reference numeral 300. The electronic device architecture comprises a number of modules, namely an applications module 301; an operating system module 302 and a hardware module 303, where each module has one or more identifier components 304 that can be associated with the electronic device. In one embodiment the invention can be implemented three ways to make a determination of device authenticity:
1. By checking that measured device properties are consistent with the claims being made by constituent components 304 of the device e.g. if the IMEI is claiming that the device is an iPhone device obtained from hardware module 303 but the browser-measured properties obtained from module 301 do not agree with known-good values for an iPhone device, a decision can be made that the device is likely to be counterfeit. This form of checking can operate within a particular device component 304 e.g. ensuring that the browser-measured characteristics agree with the browser ID, or across components e.g. ensuring that the browser-measured characteristics are consistent with a device IMEI.
2. By checking that the various identifiers captured from the device are self-consistent e.g. if the User-agent string from the browser component is claiming that the phone is an iPhone 6 but the IMEI is that of an iPhone 5, then a decision can be made that the electronic device is likely counterfeit.
3. Finally, by combining the above approaches if multiple component identifiers are available, higher confidence in the determination is possible that a device is counterfeit.

The system and method, hereinbefore described, tests the authenticity of a mobile device by checking properties measured in real time within the web browser against as many "claims" of device type as possible that can be obtained from the applications module 301; the operating system module 302 and the hardware module 303. While the real-time property measurement occurs in the browser, these properties can be checked against the IDs from any device component, including the browser. In one embodiment a known-good set of properties is gathered over time for the purpose of comparison and thus a confidence score can be assigned to the result. For example if 99% of iPhones ever seen by the measurement network have a certain value for a property, it allows one to be very confident in pronouncing a device counterfeit if the device under test has a different value for that property. If there are more than one such properties, the chance of error becomes extremely small very quickly. The real-time tests could be broadened to be not just in the browser, but measured in an 'app' that is downloaded on the mobile electronic device.

Counterfeit Device Identification Via an App Embodiment

Referring again to FIG. 4 an application or 'app' or native app can reside on the applications module 301. Native apps can be installed through an application store (such as Google Play or Apple's App Store). They are developed specifically for one platform, and can take full advantage of all the mobile device features.

With reference to FIG. 2 above a method for determining device authenticity during a visit to a web page is described. Similar to the operation of FIG. 2 when a native app is launched from an electronic device a native app can also launch a "web view", which is effectively a mini web browser running inside a native app. For example, these web views are often used when a user clicks on a link within a social media app. Thus a native app can query every available property detail of a device's hardware, including those measurable within a web context. Hence the same approach to checking device authenticity in a web context can be applied in a native app. The native app authentication method has the added benefit of having more properties available to check against the database of known-good values. This can increase reliability and confidence in the result of the authenticity check. Native mobile applications have full access to the underlying operating system and thus can query device hardware properties in great detail. A number of elements of a device's underlying hardware can be queried for manufacturer and model including CPU, GPU, sensors, screen, network interfaces and so on to aid in determining whether the device is counterfeit.

In another embodiment the native app can be a dedicated app downloaded specifically for the purpose of identifying whether the device is counterfeit. The app user can be notified of the results of the counterfeit check. The results can also be transmitted to a remote service for further action. Equally, this functionality can be embedded as a module within another app as part of an analytics function.

The mobile app incorporating the component to enable the invention can be embedded in the mobile app or alternatively can be preloaded or preinstalled on the electronic device. When a mobile app is launched on the device with the embedded component triggers operation of the invention such that a determination can be made whether the electronic device is counterfeit.

It will be appreciated that the determination of authenticity can be performed on-device or at a remote server. The device can gather all of the evidence available and send to a remote server for analysis and counterfeit determination. The result may or may not be returned to the device, depending on use case. This embodiment would have a number of advantages, namely:

1. The actual algorithm used to decide authenticity might be best kept off individual devices to ensure it is not tampered with or copied.
2. It means that the database of known-good properties would not need to be loaded onto the device.
3. It may be desirable to keep the counterfeit determination result private.

The described embodiments of the invention are only examples of how the invention may be implemented. Modifications, variations and changes to the described embodiments will occur to those having appropriate skills and knowledge. These modifications, variations and changes may be made without departure from the scope of the claims.

For example, the counterfeit detection apparatus 108 is described as being implemented in a server and the device property store 110 is implemented in a memory device of the server. This is not essential. The counterfeit detection apparatus 108 and device property store 110 may be separate from one another. They may additionally be located at different physical locations. This may mean that they communicate with each other via a Local Area Network (LAN) or via the Internet 106.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. A method of determining that a subject electronic device is counterfeit, the method comprising:
receiving a request from the subject electronic device for a specified web page component, the specified web page component for rendering by a browser of the subject electronic device in order to perform one or more executable operations to determine one or more properties of the subject electronic device, the one or more executable operations being performed by a computer processor of the subject electronic device by executing computer executable code associated with the specified web page component in order to generate a result;
in response to the request, delivering the specified web page component to the subject electronic device, which specified web page component is adapted to determine the one or more properties of the subject electronic device by retrieving from the subject electronic device one or more actual values of one or more attributes of the subject electronic device from memory of the subject electronic device by the performing of the one or more operations using the browser;

receiving the one or more actual values of the one or more attributes from the specified web page component;

retrieving one or more reference values corresponding to the one or more attributes from a device property store;

determining that the subject electronic device is counterfeit when at least one of the one or more actual values is different than a reference value of an attribute, the reference value of the one or more reference values, and the attribute of the one or more attributes;

sending a token to the specified web page component, the token indicating that the subject electronic device is counterfeit; and inhibiting access of the subject electronic device to a web page hosted by a web server based on the token;

wherein the one or more properties include a characteristic of the subject electronic device and each property of the one or more properties includes an attribute of the one or more attributes.

2. The method of claim 1, comprising:

receiving identity information representing an identity of the subject electronic device; and selecting the one or more reference values corresponding to the one or more attributes based on the identity information.

3. The method of claim 2, wherein receiving the identity information comprises the request received from the subject electronic device including the identity information.

4. The method of claim 2, wherein the identity information is a User-Agent string.

5. The method of claim 4, wherein the identity information is an International Mobile Station Equipment Identity, IMEI, or Type Allocation Code, TAC, of the subject electronic device.

6. The method of claim 2, wherein receiving the identity information comprises receiving the identity information from a mobile communications network via which the subject electronic device sends the request.

7. A non-transitory computer readable medium including instructions for carrying out the method of claim 1 when processed by computer processing means.

8. The method of claim 1, wherein the one or more actual values of the one or more attributes are retrieved from the memory by the browser for a module, the module selected from the group consisting of: an applications module; an operating system module; or a hardware module.

9. Apparatus for determining that a subject electronic device is counterfeit, the apparatus comprising a server arranged to:

receive a request from the subject electronic device for a specified web page component, the specified web page component for rendering by a browser of the subject electronic device in order to perform one or more executable operations to determine one or more properties of the subject electronic device, the one or more executable operations being performed by a computer processor of the subject electronic device by executing computer executable code associated with the specified web page component in order to generate a result;

in response to the request, deliver the specified web page component to the subject electronic device, which the specified web page component is adapted to determine the one or more properties of the subject electronic device by retrieving from the subject electronic device one or more actual values of one or more attributes of the subject electronic device from memory of the subject electronic device by the performing of the one or more operations using the browser;

receive the one or more actual values of the one or more attributes from the specified web page component, the one or more actual values returned as the result of said executing computer executable code;

retrieve one or more reference values corresponding to the one or more attributes from a device property store;

determine that the subject electronic device is counterfeit when at least one of the one or more actual values is different than a reference value of an attribute, the reference value of the one or more reference values, and the attribute of the one or more attributes;

send a token to the specified web page component, the token indicating that the subject electronic device is counterfeit; and inhibit access of the subject electronic device to a web page hosted by a web server based on the token;

wherein the one or more properties include a characteristic of the subject electronic device and each property of the one or more properties includes an attribute of the one or more attribute.

10. The apparatus of claim 9, wherein the one or more actual values of the one or more attributes are retrieved from the memory by the browser for a module, the module selected from the group consisting of: an applications module; an operating system module; and a hardware module.

11. A method of determining that a subject electronic device is counterfeit, the method comprising:

receiving a request from the subject electronic device for a mobile app and downloading the mobile app to the subject electronic device;

configuring a component associated with the mobile app, the component for rendering by a browser of the subject electronic device in order to perform one or more executable operations to determine one or more properties of the subject electronic device by retrieving from the subject electronic device one or more actual values of one or more attributes of the subject electronic device from memory of the subject electronic device by the performing of the one or more operations using the browser, the one or more executable operations being performed by a computer processor of the subject electronic device by executing computer executable code associated with the component in order to generate a result;

receiving the one or more actual values of the one or more attributes from the component, the one or more actual values returned as the result of said executing computer executable code;

retrieving one or more reference values corresponding to the one or more attributes from a device property store;

determining that the subject electronic device is counterfeit when at least one of the one or more actual values is different than a reference value of an attribute, the reference value of the one or more reference values, and the attribute of the one or more attributes;

sending a token to the component, the token indicating that the subject electronic device is counterfeit; and inhibiting access of the subject electronic device to a web page hosted by a web server based on the token;

wherein the one or more properties include a characteristic of the subject electronic device and each property of the one or more properties includes an attribute of the one or more attributes.

12. The method of claim 11, wherein the step of receiving a request is triggered when the subject electronic device launches the mobile app residing on the device or when the mobile app is downloaded to the subject electronic device from a remote location.

13. The method of claim 11, wherein the mobile app residing on the subject electronic device comprises at least one of: a pre-provisioned app; a stock app; or a default app.

14. The method of claim 11, wherein the one or more actual values of the one or more attributes are retrieved from the memory by the browser for a module, the module selected from the group consisting of: an applications module; an operating system module; and a hardware module.

15. A method of determining that a subject electronic device is counterfeit, the method comprising:

configuring a component associated with a mobile app residing on the subject electronic device, the component for rendering by a browser of the subject electronic device in order to perform one or more executable operations to determine one or more properties of the subject electronic device by retrieving from the subject electronic device one or more actual values of one or more attributes of the subject electronic device from memory of the device by the performing of the one or more operations using the browser;

receiving the one or more actual values of the one or more attributes from the component, the one or more actual values returned as the result of said executing computer executable code;

retrieving one or more reference values corresponding to the one or more attributes from a device property store;

determining that the subject electronic device is counterfeit when at least one of the one or more actual values is different than a reference value of an attribute, the reference value of the one or more reference values, and the attribute of the one or more attributes;

sending a token to the component, the token indicating that the subject electronic device is counterfeit; and inhibiting access of the subject electronic device to a web page hosted by a web server based on the token;

wherein the one or more properties include a characteristic of the subject electronic device and each property of the one or more properties includes an attribute of the one or more attributes.

16. The method of claim 15, wherein the one or more actual values of the one or more attributes are retrieved from the memory by the browser for a module, the module selected from the group consisting of: an applications module; an operating system module; and a hardware module.

* * * * *